United States Patent
Kang

(10) Patent No.: US 11,190,237 B2
(45) Date of Patent: Nov. 30, 2021

(54) WIRELESS COMMUNICATION DEVICE FOR DETECTING CARD

(71) Applicant: Samsung Electronics Co., Ltd., Suwon-si (KR)

(72) Inventor: Hyunjae Kang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/566,011

(22) Filed: Sep. 10, 2019

(65) Prior Publication Data
US 2020/0274580 A1    Aug. 27, 2020

(30) Foreign Application Priority Data
Feb. 22, 2019  (KR) .................. 10-2019-0021155

(51) Int. Cl.
*H04B 5/00* (2006.01)
*G06K 19/07* (2006.01)
*G06K 7/10* (2006.01)

(52) U.S. Cl.
CPC ....... *H04B 5/0037* (2013.01); *G06K 7/10366* (2013.01); *G06K 19/0715* (2013.01); *H04B 5/0062* (2013.01)

(58) Field of Classification Search
CPC ............... H04B 5/0037; H04B 5/0062; G06K 7/10366; G06K 19/0715
See application file for complete search history.

(56) References Cited

U.S. PATENT DOCUMENTS

| | | | |
|---|---|---|---|
| 8,401,596 B2 | 3/2013 | Takayama | |
| 8,824,961 B2* | 9/2014 | Royston | G06K 7/10138 455/41.1 |
| 8,942,628 B2* | 1/2015 | Haverinen | H04B 5/02 455/41.1 |
| 9,536,118 B2* | 1/2017 | Kang | G06K 7/10128 |
| 9,634,727 B2* | 4/2017 | Ozenne | H04B 5/0087 |
| 2006/0052055 A1* | 3/2006 | Rowse | G06K 7/0008 455/41.1 |
| 2012/0028575 A1* | 2/2012 | Chen | G06K 19/0705 455/41.1 |

(Continued)

FOREIGN PATENT DOCUMENTS

| | | |
|---|---|---|
| JP | 4765743 B2 | 9/2011 |
| JP | 2016-201674 A | 12/2016 |

*Primary Examiner* — Thomas D Alunkal
(74) *Attorney, Agent, or Firm* — Harness, Dickey & Pierce, P.L.C.

(57) ABSTRACT

A wireless communication device for detecting a card may include a signal generating circuit that generates a power signal for supplying a first power to a card, first communication signals for communicating with the card based on the first power, and a second communication signal for communicating with the card based on a second power supplied to the card, and a detecting circuit that detects a response signal received from the card, when the first communication signals or the second communication signal is output to the card. The signal generating circuit generates the first communication signals and the second communication signal such that the second power is supplied to the card by the first communication signals or the second communication signal.

16 Claims, 8 Drawing Sheets

(56) References Cited

U.S. PATENT DOCUMENTS

| | | | | |
|---|---|---|---|---|
| 2012/0040611 A1* | 2/2012 | Griffin | ............... | H04W 52/028 |
| | | | | 455/41.1 |
| 2017/0155429 A1* | 6/2017 | Hung | ............... | H04W 4/80 |
| 2018/0070220 A1* | 3/2018 | Kang | ............... | H04B 5/0037 |
| 2020/0036412 A1* | 1/2020 | Hueber | ............... | H04B 5/0075 |

* cited by examiner

WIRELESS COMMUNICATION DEVICE FOR DETECTING CARD

CROSS-REFERENCE TO RELATED APPLICATIONS

This application claims priority under 35 U.S.C. § 119 to Korean Patent Application No. 10-2019-0021155 filed on Feb. 22, 2019, in the Korean Intellectual Property Office, the disclosure of which are incorporated by reference herein in its entireties.

BACKGROUND

Example embodiments of the inventive concepts described herein relate to an electronic device. For example, at least some example embodiments relate to a wireless communication device configured to detect a card.

Radio frequency identification (RFID) refers to a communication manner that allows a reader placed at a short distance to supply a power to a card and to communicate with the card. Near field communication (NFC) is being used as an example of the RFID.

A wireless communication device that is used in the near field communication (NFC) may provide both a reader function and a card function. That is, the NFC provides high flexibility in that one communication device can be used as both a reader and a card.

In general, a near field communication device may be mounted on a mobile device such as a smartphone or a smart watch. Accordingly, as the mobile device is miniaturized, a size of an antenna of the near field communication device may also be miniaturized. In the case where the near field communication device uses a small-sized antenna, the near field communication device may use a short pulse for detection for the purpose of increasing (or, alternatively, maximizing) a distance in which a card is able to be detected.

SUMMARY

Example embodiments of the inventive concepts provide a wireless communication device that may reduce a power consumed to detect a card.

According to an example embodiment, a wireless communication device may include a signal generating circuit and a detecting circuit. The signal generating circuit may be configured to, generate a power signal associated with supplying a first power to a card, generate first communication signals associated with communicating with the card based on the first power, and generate a second communication signal associated with communicating with the card based on a second power supplied to the card, the second power being supplied to the card via the first communication signals or the second communication signal. The detecting circuit may be configured to detect a response signal received from the card, in response to the first communication signals or the second communication signal being output to the card.

According to an example embodiment, a wireless communication device may include a signal generating circuit and a detecting circuit. The signal generating circuit may be configured to, generate a power signal associated with supplying a power to a card, generate first communication signals associated with communicating with the card based on the power, and generate a second communication signal associated with communicating with the card such that the second communication signal has a same waveform as the power signal. The detecting circuit may be configured to detect a response signal received from the card, in response to output of one or more of the first communication signals and the second communication signal, wherein the power signal, the first communication signals and the second communication signal are output sequentially.

According to an example embodiment, a wireless communication device may include a signal generating circuit and a detecting circuit. The signal generating circuit may be configured to, generate a power signal for supplying a power to a card, and generate communication signals for communicating with the card based on the power such that at least one of the communication signals has a same waveform as the power signal. The detecting circuit may be configured to detect the card based on a response signal received from the card, in response to one of the communication signals output thereto corresponding to a type of the card while the card is within a detection distance of the wireless communication device.

BRIEF DESCRIPTION OF THE FIGURES

The above and other objects and features of example embodiments of the inventive concepts will become apparent by describing in detail exemplary embodiments thereof with reference to the accompanying drawings.

DETAILED DESCRIPTION

Below example embodiments of the inventive concepts may be described in detail and clearly to such an extent that an ordinary one in the art easily implements example embodiments of the inventive concepts.

Figure 1:
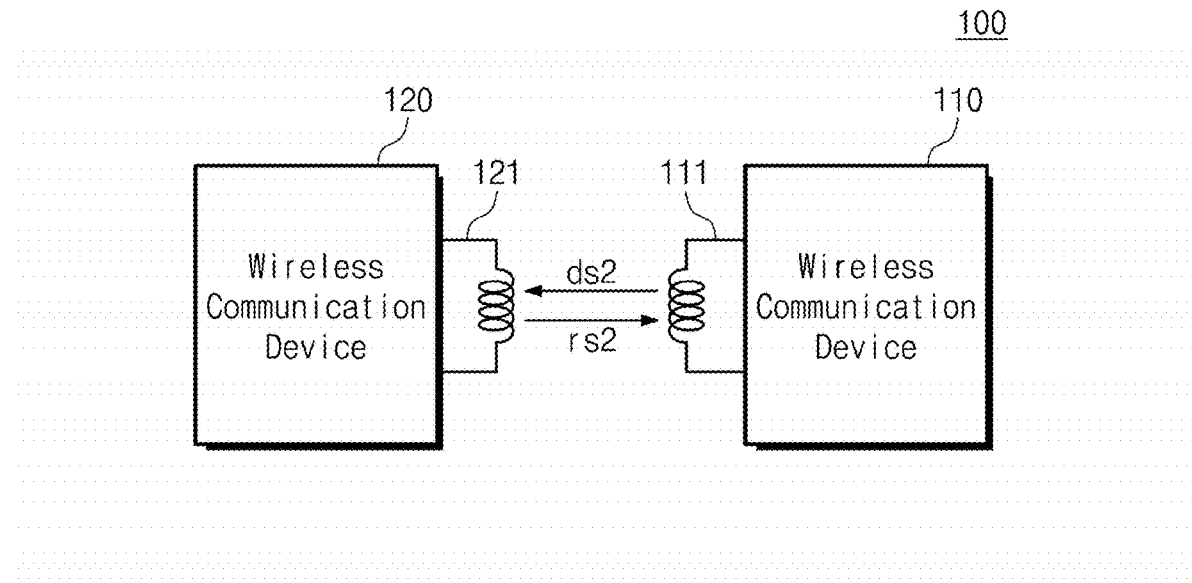
FIG. 1 is a conceptual diagram for describing a near field communication system.

FIG. 1 is a conceptual diagram for describing a near field communication system.

Referring to FIG. 1, a near field communication (NFC) system 100 may include wireless communication devices 110 and 120. For example, the wireless communication devices 110 and 120 may be near field communication (NFC) devices. The wireless communication devices 110 and 120 may be respectively connected with antennas 111 and 121.

Each of the wireless communication devices 110 and 120 may operate in a reader mode or a card mode. For example, the wireless communication device 110 may operate in the reader mode, and the wireless communication device 120 may operate in the card mode. For another example, the wireless communication device 120 may operate in the reader mode, and the wireless communication device 110 may operate in the card mode. In the following descriptions, it is assumed that the wireless communication device 110 operates in the reader mode and the wireless communication device 120 operates in the card mode. The wireless communication device 110 that operates in the reader mode may be referred to as a "reader", and the wireless communication device 120 that operates in the card mode may be referred to as a "card".

The wireless communication device 110 may output a detection signal ds2 to the wireless communication device 120 through electromagnetic induction between the antenna 111 and the antenna 121. The wireless communication device 110 may detect the wireless communication device 120 by using the detection signal ds2. The detection signal ds2 may include a power signal, a transmitting signal, and a receiving signal. The power signal may be a signal for supplying a power to the wireless communication device 120. The transmitting signal may be a signal for transmitting information to the wireless communication device 120. The wireless communication device 110 may modulate an information signal to generate the transmitting signal. The information signal may include information for communicating with the wireless communication device 120. The receiving signal may be a signal that is output to receive a response signal rs2 from the wireless communication device 120. The power signal, the transmitting signal, and the receiving signal may be sequentially output. That is, the transmitting signal may be output after the power signal is output, and the receiving signal may be output after the transmitting signal is output.

The wireless communication device 110 may output various types of transmitting signals. The wireless communication device 110 may generate various types of transmitting signals by differently setting the degree to which an information signal is modulated (i.e., a modulation index). Transmitting signals of different types may correspond to wireless communication devices 120 of different types, which operate in the reader mode. That is, the wireless communication device 120 may respond to a transmitting signal, the type of which corresponds to a type of the wireless communication device 120. In detail, types of transmitting signals may include Type A, Type B, Type F, Type V, and Type K. Types of transmitting signals included in one detection signal ds2 may be different. A type of the wireless communication device 120 may be one of Type A, Type B, Type F, Type V, and Type K. In the case where the type of the wireless communication device 120 is Type B, the wireless communication device 120 may respond to a transmitting signal of Type A.

The wireless communication device 120 may be supplied with a power from the power signal. The wireless communication device 120 itself may be configured to not supply a power. Accordingly, the wireless communication device 120 may start to communicate with the wireless communication device 110 after a power is supplied to the wireless communication device 120 by, for example, the wireless communication device 110. In the case where a transmitting signal of a type corresponding to the type of the wireless communication device 120 is received, the wireless communication device 120 may output the response signal rs2. The response signal rs2 may be a signal that is obtained by modulating a receiving signal that is received subsequently after a transmitting signal is received. That is, the wireless communication device 120 may output the response signal rs2 based on a receiving signal. The wireless communication device 120 may transmit the response signal rs2 to the wireless communication device 110 through electromagnetic induction between the antenna 121 and the antenna 111.

In other words, the wireless communication device 110 may output the detection signal ds2 for the purpose of detecting the wireless communication device 120. In the case where the wireless communication device 120 is within a card detection distance of the detection signal ds2, the wireless communication device 120 may output the response signal rs2 in response to the detection signal ds2. The card detection distance of the detection signal ds2 may mean a maximum distance within which the wireless communication device 110 may detect the wireless communication device 120 by using the detection signal ds2. The wireless communication device 110 may receive the response signal rs2 and may detect the wireless communication device 120 within the card detection distance.

Figure 2:
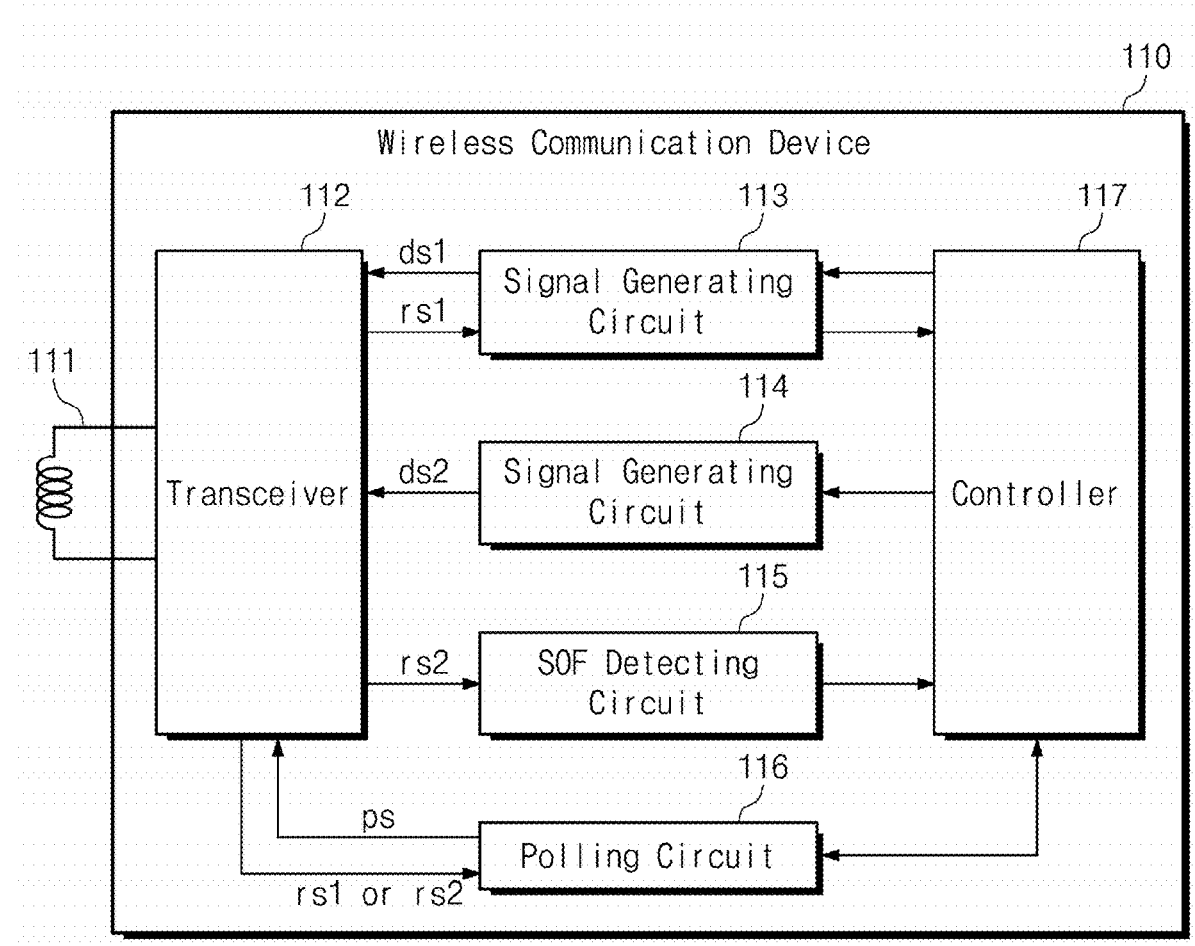
FIG. 2 is a block diagram illustrating a wireless communication device of FIG. 1.

FIG. 2 is a block diagram illustrating the wireless communication device 110 of FIG. 1. For better understanding, FIG. 1 will be referenced together.

Referring to FIGS. 1 and 2, the wireless communication device 110 may include the antenna 111, a transceiver 112, signal generating circuits 113 and 114, a start of frame (SOF) detecting circuit 115, a polling circuit 116, and a controller 117.

For example, the wireless communication device 110 (or the wireless communication device 120) may be implemented using processing circuitry such as hardware including logic circuits, a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC) a programmable logic unit, a microprocessor, or an application-specific integrated circuit (ASIC), etc.

The processing circuitry may be configured as one or more discrete special purpose processing circuitry to perform the functions of one or more of the transceiver 112, the signal generating circuits 113 and 114, the start of frame (SOF) detecting circuit 115, the polling circuit 116, and the controller 117.

The transceiver 112 may transmit a signal to the wireless communication device 120 through the antenna 111 or may receive a signal from the wireless communication device 120.

The signal generating circuit 113 may generate a detection signal ds1 under control of the controller 117. The detection signal ds1 may be periodically generated under control of the controller 117. The signal generating circuit 113 may output the detection signal ds1 to the transceiver 112. The transceiver 112 may output the detection signal ds1 to the wireless communication device 120.

The wireless communication device 110 may detect the wireless communication device 120 based on the detection signal ds1. In the case where the wireless communication device 120 is within a card detection distance of the detection signal ds1 when the detection signal ds1 is output, a magnitude of a current flowing in the antenna 111 by the electromagnetic induction may change. As the magnitude of the current flowing in the antenna 111 changes, a magnitude of an internal voltage of the wireless communication device 110 may change. In detail, the magnitude of the internal voltage may mean a voltage difference across the antenna 111. In the case where a magnitude change in the internal voltage of the wireless communication device 110 is detected, the transceiver 112 may output a response signal rs1 to the signal generating circuit 113. In the case where the response signal rs1 is received, the signal generating circuit 113 may transmit, to the controller 117, a signal indicating that the response signal rs1 is received. In the case where a signal is received from the signal generating circuit 113, the controller 117 may control the signal generating circuit 113 such that the signal generating circuit 113 stops generating the detection signal ds1. The signal generating circuit 113 may stop generating the detection signal ds1 under control of the controller 117.

In the case where the detection signal ds1 is output during a given time or longer, even though the response signal rs1 is not received, the signal generating circuit 113 may stop generating the detection signal ds1 under control of the controller 117.

In the case where the detection signal ds1 is not generated while the response signal rs1 is not received, the signal generating circuit 114 may generate the detection signal ds2 under control of the controller 117. As described with reference to FIG. 1, the detection signal ds2 may include a power signal, a transmitting signal, and a receiving signal. A configuration of the detection signal ds2 will be more fully described with reference to FIGS. 4 to 11. The transceiver 112 may output the detection signal ds2 to the wireless communication device 120.

In the case where the wireless communication device 120 is within the card detection distance of the detection signal ds2, the wireless communication device 120 may output the response signal rs2 in response to the detection signal ds2. In the case where the response signal rs2 is received from the wireless communication device 120, the transceiver 112 may output the response signal rs2 to the SOF detecting circuit 115. The response signal rs2 may include a start of frame (SOF). The SOF detecting circuit 115 may detect the SOF. In the case where the SOF is detected, the SOF detecting circuit 115 may transmit, to the controller 117, a signal indicating that the response signal rs2 is received. In the case where a signal is received from the SOF detecting circuit 115, the controller 117 may control the signal generating circuit 114 such that the signal generating circuit 114 stops generating the detection signal ds2. The signal generating circuit 114 may stop generating the detection signal ds2 under control of the controller 117.

In the case where the detection signal ds2 is output during a given time or longer, even though the response signal rs2 is not received, the signal generating circuit 114 may stop generating the detection signal ds2 under control of the controller 117. In the case where the detection signal ds2 is not generated while the response signal rs2 is not received, the signal generating circuit 113 may again generate the detection signal ds1 under control of the controller 117.

In the case where the response signal rs1 or the response signal rs2 is received, the polling circuit 116 may perform polling under control of the controller 117. The polling may be an identification procedure that is performed for the wireless communication device 110 to communicate with the different wireless communication device 120 and may be defined by the standard of the near field communication (NFC). The wireless communication device 110 may perform the polling to obtain information included in the wireless communication device 120.

The polling circuit 116 may generate a polling signal ps under control of the controller 117. The polling circuit 116 may output the polling signal ps to receive the response signal rs1 or the response signal rs2. In the case where there is detected a magnitude change in the internal voltage of the wireless communication device 110 as the detection signal ds1 is output, the transceiver 112 may output the response signal rs1 to the polling circuit 116 in response to the polling signal ps. In the case where the response signal rs2 is received, the transceiver 112 may output the response signal rs2 to the polling circuit 116 in response to the polling signal ps. The polling circuit 116 may perform one of polling of a first mode and polling of a second mode under control of the controller 117.

For example, in the case where the response signal rs1 is received, the polling circuit 116 may perform the polling of the first mode under control of the controller 117. The polling of the first mode may include performing polling sequentially on first types of the near field communication (NFC). The first types may be types of the wireless communication device 120 that may be detected by the detection signal ds1. For example, the first types may include Type A, Type B, Type F, Type V, and Type K.

For another example, in the case where the response signal rs2 is received, the polling circuit 116 may perform the polling of the second mode under control of the controller 117. The polling of the second mode may include performing polling on one or more types designated by the controller 117 from among second types of the near field communication (NFC). The second types may be types of the wireless communication device 120 that may be detected by the detection signal ds2. For example, the second types may include all or a part of Type A, Type B, Type F, Type V, and Type K. The first types may be different from the second types, but the inventive concept is not limited thereto.

Figure 3:
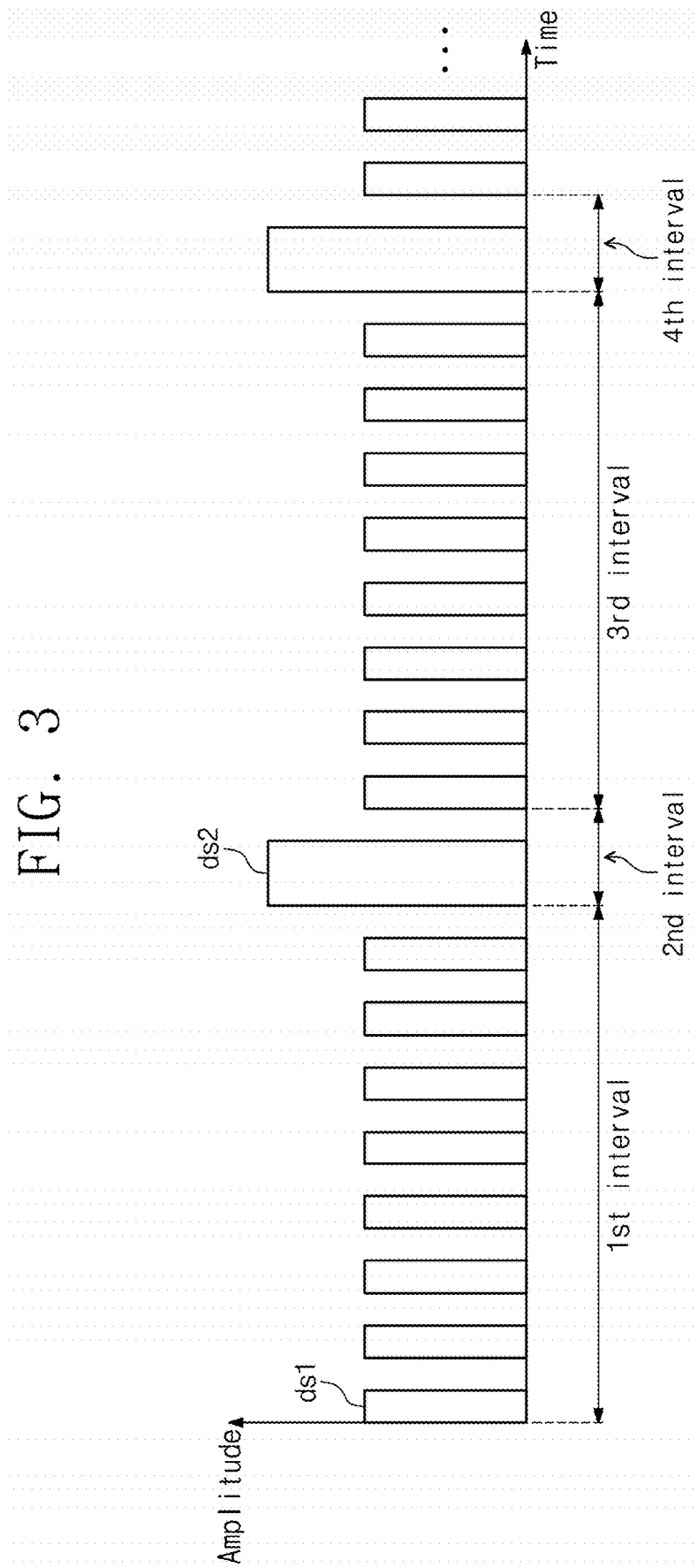
FIG. 3 is a conceptual diagram for describing detection signals.

FIG. 3 is a conceptual diagram for describing detection signals. For better understanding, FIG. 2 will be referenced together.

Referring to FIGS. 2 and 3, as described with reference to FIG. 2, the signal generating circuit 113 may output the signal ds1 under control of the controller 117. The signal ds1 may be a pulse signal. The signal ds1 may be periodically output within a first interval under control of the controller 117. In the case where the response signal rs1 is not received even though the signal ds1 is output during a time length of the first interval, the signal generating circuit 113 may stop outputting the signal ds1 under control of the controller 117.

Instead, the signal generating circuit 114 may generate the signal ds2 under control of the controller 117. The signal ds2 may be output within a second interval. In the case where the response signal rs2 is not received even though the signal ds2 is output during a time length of the second interval, the signal generating circuit 114 may stop outputting the signal ds2 under control of the controller 117. The wireless communication device 110 may repeatedly perform the above operations until the response signal rs1 or the response signal rs2 is received. In the case where the response signal rs1 or the response signal rs2 is received, the wireless communication device 110 may stop outputting the signals ds1 and ds2 and may perform polling.

An amplitude of the detection signal ds2 may be greater than an amplitude of the detection signal ds1. That is, the intensity of the detection signal ds2 may be greater than the intensity of the detection signal ds1. That is, a card detection distance of the detection signal ds2 may be longer than a card detection distance of the detection signal ds1. The wireless communication device 110 may detect the wireless communication device 120 that is further away from the wireless communication device 110, by using the detection signal ds2. The wireless communication device 110 may reduce a power that is consumed to supply a power to the wireless communication device 120 in the second interval, by using the detection signal ds2 according to an example embodiment of the inventive concepts. This may mean that the wireless communication device 110 reduces a power that is consumed to detect the wireless communication device 120.

Figure 4:
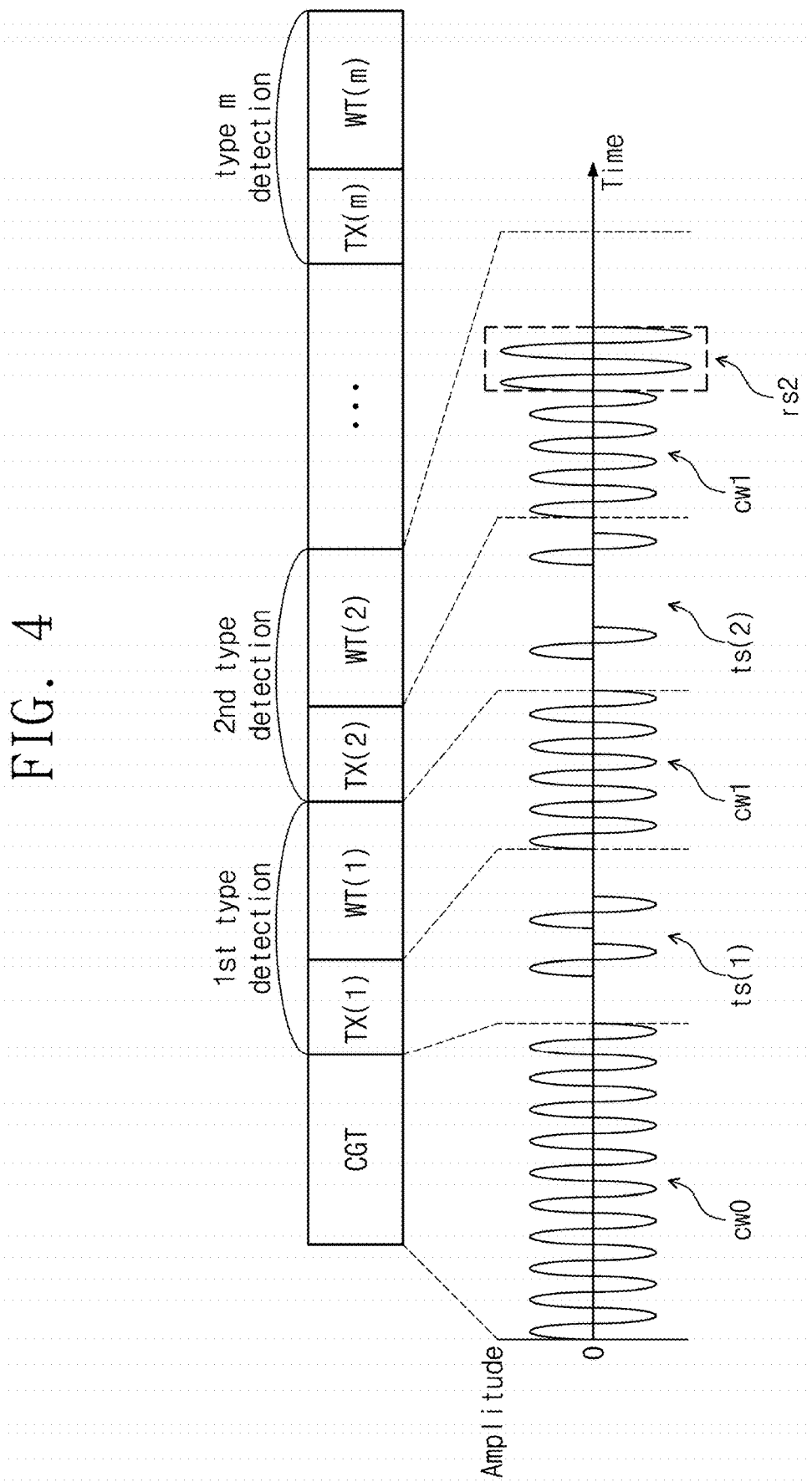
FIG. 4 is a conceptual diagram for describing a detection signal according to an example embodiment of the inventive concepts.

FIG. 4 is a conceptual diagram for describing the detection signal ds2 according to an example embodiment of the inventive concepts. For better understanding, FIGS. 1 and 2 will be referenced together.

Referring to FIGS. 1, 2 and 4, in the following descriptions, a communication signal cs(n) means a transmitting signal ts(n) and a receiving signal cw1. The communication signal cs(n) and the transmitting signal ts(n) mean a signal corresponding to the wireless communication device 120 of an n type. In the following descriptions, the communication signal cs(n) and the transmitting signal ts(n) may be referred to as a "communication signal of the n type" and a "transmitting signal of the n type". The n-type wireless communication device 120 may output the response signal rs2 based on the transmitting signal ts(n).

The detection signal ds2 may include one power signal cw0 and a plurality of communication signals cs(1) to cs(m). In detail, a communication signal cs(1) may include a transmitting signal ts(1) and a receiving signal cw1. A communication signal cs(2) may include a transmitting signal ts(2) and a receiving signal cw1.

The power signal cw0 may be a signal for supplying a power to the wireless communication device 120. The power signal cw0 may be a continuous wave. After the wireless communication device 110 outputs one power signal cw0, subsequently, the wireless communication device 110 may output the plurality of communication signals cs(1) to cs(m). The plurality of communication signals cs(1) to cs(m) may be signals corresponding to the wireless communication devices of different types, respectively. For example, each of the plurality of communication signals cs(1) to cs(m) may be one of Type A, Type B, Type F, Type V, and Type K communication signals.

FIG. 4 shows a common guard interval CGT where one power signal cw0 is output, and communication intervals (TX(1), WT(1)) to (TX(m), WT(m)) where the plurality of communication signals cs(1) to cs(m) are output. Referring to FIG. 4, the common guard interval CGT and the communication intervals (TX(1), WT(1)) to (TX(m), WT(m)) may be listed in a row. An order in which the common guard interval CGT and the communication intervals (TX(1), WT(1)) to (TX(m), WT(m)) are listed may indicate an order in which the power signal cw0 and the plurality of communication signals cs(1) to cs(m) corresponding to the common guard interval CGT and the communication intervals (TX(1), WT(1)) to (TX(m), WT(m)) are output.

FIGS. 4 and 9 to 11 illustrate time intervals. The time intervals indicate intervals where signals included in the detection signal ds2 are output. The wireless communication device 110 may sequentially output the signals included in the detection signal ds2. An order in which time intervals are listed may mean an order in which signals are output from the wireless communication device 110.

That is, the wireless communication device 120 may output the power signal cw0 and the plurality of communication signals cs(1) to cs(m) in an order in which the common guard interval CGT and the communication intervals (TX(1), WT(120)) to (TX(m), WT(m)) are listed. The order in which the plurality of communication signals cs(1) to cs(m) are output may be determined according to a modulation index of transmitting signals ts(1) to ts(m). The order in which the plurality of communication signals cs(1) to cs(m) are output will be described with reference to FIGS. 9 to 11.

The wireless communication device 110 may output the power signal cw0 in the common guard interval CGT. After the wireless communication device 110 outputs the power signal cw0, the wireless communication device 110 may output the transmitting signal ts(1). The transmitting signal ts(1) may be a signal that is used to communicate with the wireless communication device 120 of a first type. The wireless communication device 110 may output the transmitting signal ts(1) and may then output the receiving signal cw1. The receiving signal cw1 may be a signal that is output to receive the response signal rs2 from the wireless communication device 120. The receiving signal cw1 may be a continuous wave. For example, the receiving signal cw1 may be the same as the power signal cw0.

In the case where the wireless communication device 120 is of the first type, the wireless communication device 120 may output the response signal rs2 in response to the transmitting signal ts(1). The wireless communication device 120 may transmit the response signal rs2 to the wireless communication device 110 based on the receiving signal cw1 output within a reception interval WT(1). A time length of the reception interval WT(1) may be set by a user (e.g., an inventor) or may be set by an internal processor of the wireless communication device 110 or an external processor. For example, the time length of the reception interval WT(1) may be set based on an empirical study or defined by the standard of the near field communication (NFC).

In the case where the response signal rs2 is not received within the reception interval WT(1), the wireless communication device 110 may output the transmitting signal ts(2). The transmitting signal ts(2) may be a signal that is used to communicate with the wireless communication device 120 of a second type. The wireless communication device 110 may not output the separate power signal cw0 between the reception interval WT(1) and a transmission interval TX(2). That is, the wireless communication device 120 may communicate with the wireless communication device 110 within the communication intervals (TX(1), WT(1)) to (TX(m), WT(m)) by using the power supplied within the common guard interval CGT. A time length of the common guard interval CGT may be a desired (or, alternatively, a minimum) time length to supply a desired (or, alternatively, a minimum) power required for the wireless communication device 120 to communicate with the wireless communication device 110 within the communication intervals (TX(1), WT(120)) to (TX(m), WT(m)).

The wireless communication device 110 may output the transmitting signal ts(2) and may then output the receiving signal cw1. In the case where the wireless communication device 120 is of the second type, the wireless communication device 120 may output the response signal rs2 in response to the transmitting signal ts(2). The response signal rs2 may include an SOF. The wireless communication device 120 may detect the SOF. In the case where the SOF is detected within the reception interval WT(2), the wireless communication device 120 may stop outputting the detection signal ds2. The wireless communication device 110 may stop outputting the detection signal ds2 and may perform the polling of the second mode. Each of the reception intervals WT(1) to WT(m) may be at least a minimum time length for the wireless communication device 110 to detect the response signal rs2 when the response signal rs2 is output from the wireless communication device 120 within each of the reception intervals WT(1) to WT(m).

Figure 5:
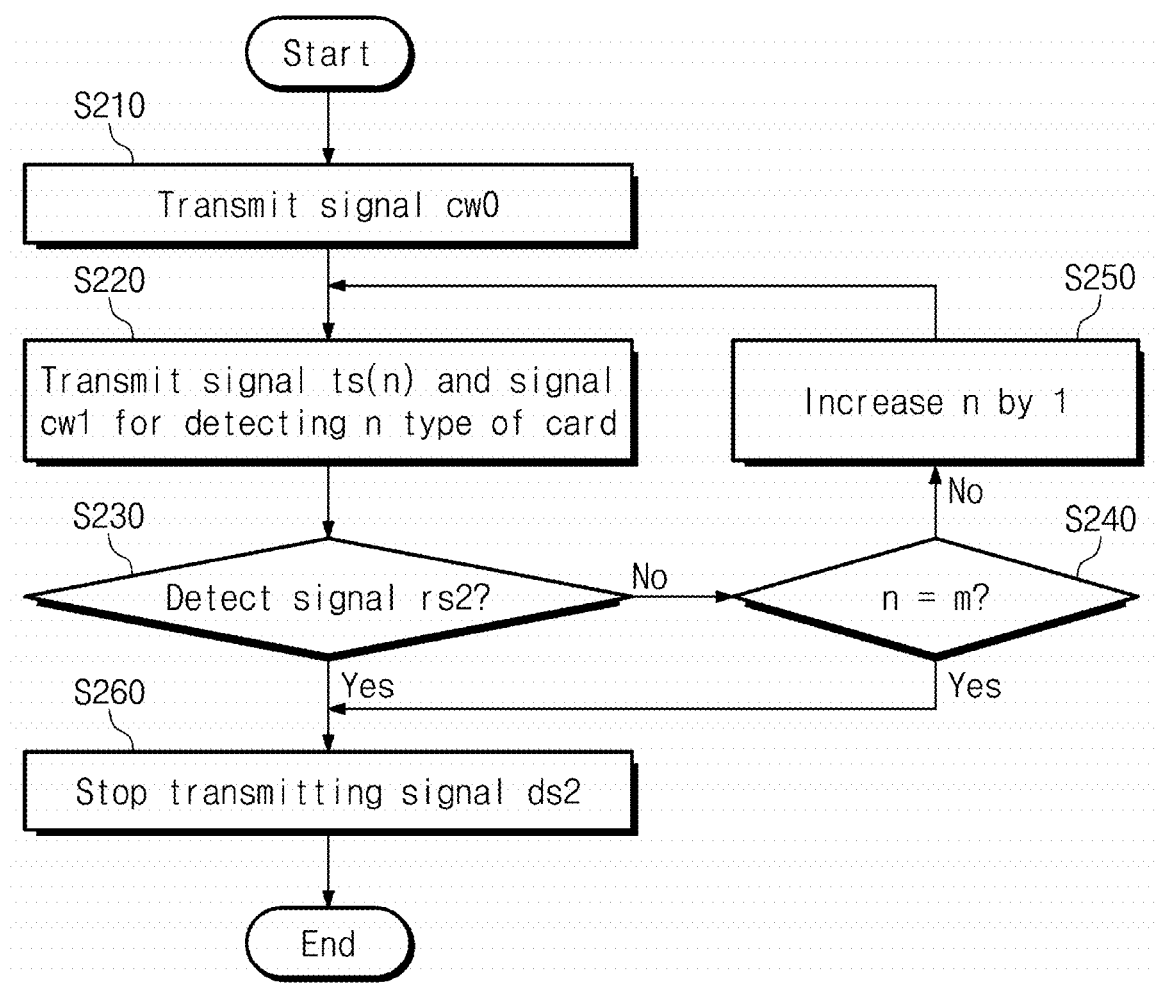
FIG. 5 is a flowchart for describing a method in which a wireless communication device of FIG. 2 outputs a detection signal.

FIG. 5 is a flowchart for describing a method in which a wireless communication device of FIG. 2 outputs the detection signal ds2. For better understanding, FIGS. 1, 2, and 4 will be referenced together.

Referring to FIGS. 1, 2, 4 and 5, in operation S210, the wireless communication device 110 may output the power signal cw0 within the common guard interval CGT.

In operation S220, the wireless communication device 110 may output the transmitting signal ts(n) and the receiving signal cw1, where "n" may be "1" since operation S220 is performed immediately after the wireless communication device 110 outputs the power signal cw0 in operation S210. That is, the wireless communication device 110 may output the power signal cw0 and may then output the transmitting signal ts(1) and the receiving signal cw1.

In the case where the wireless communication device 120 is of an n type, the wireless communication device 120 may output the response signal rs2 in response to the transmitting signal ts(n), and, thus in operation S230, the wireless communication device 110 may detect the response signal rs2. In the case where the response signal rs2 is detected with the reception interval WT(n) (Yes in S230), operation S260, the wireless communication device 110 may stop outputting the detection signal ds2. In this case, the wireless communication device 110 may perform the polling of the second mode.

In the case where the response signal rs2 is not received within the reception interval WT(n), (No in S230), in operation S240, the wireless communication device 110 may determine whether the transmitting signal ts(m) was output in operation S220. If the transmitting signal ts(m) was output (Yes in S240), in operation S260, the wireless communication device 110 may also stop outputting the detection signal ds2 when the response signal rs2 is not received. In this case, the wireless communication device 110 may output the detection signal ds1 instead of the detection signal ds2.

In the case where the transmitting signal ts(m) is not output in operation S220 (No in S240), in operations S250 and S220, the wireless communication device 110 may increment n by 1 and output a transmitting signal ts(n+1) and the receiving signal cw1. The wireless communication device 110 may not output the power signal cw0 again before the wireless communication device 110 outputs the transmitting signal ts(n+1) and the receiving signal cw1.

That is, according to an example embodiment of the inventive concepts, a separate guard interval for supplying a power to the wireless communication device 120 between the plurality of communication intervals (TX(1), WT(1)) to (TX(m), WT(m)) may not be required. Also, a time length of the common guard interval CGT may be a desired (or, alternatively, a minimum) time length to supply a desired (or, alternatively, a minimum) power required for the wireless communication device 120 to communicate with the wireless communication device 110 within the communication intervals (TX(1), WT(1)) to (TX(m), WT(m)). According to an example embodiment of the inventive concepts, a power that is consumed for the wireless communication device 110 to detect the wireless communication device 120 may be reduced.

Also, according to an example embodiment of the inventive concepts, the plurality of communication signals cs(1) to cs(m) may be output in an order determined to reduce a power that is consumed for the wireless communication device 110 to detect the wireless communication device 120. The order in which the plurality of communication signals cs(1) to cs(m) are output may be associated with to a modulation index of the plurality of transmitting signals ts(1) to ts(m). The order in which the wireless communication device 110 outputs the communication signals cs(1) to cs(m) will be described with reference to FIGS. 9 to 11.

Figure 6:
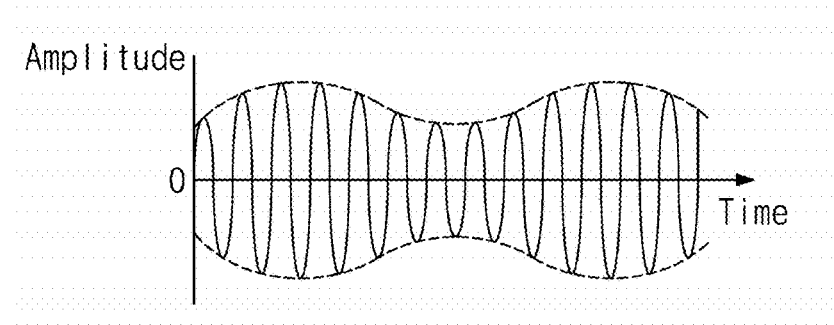
FIG. 6 is a conceptual diagram for describing a transmitting signal, the modulation index of which is a value (excluding "0" and "1") between "0" and "1".
Figure 7:
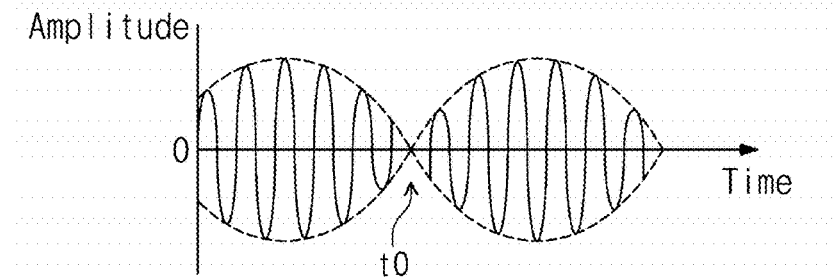
FIG. 7 is a conceptual diagram for describing a transmitting signal, the modulation index of which is "1".
Figure 8:
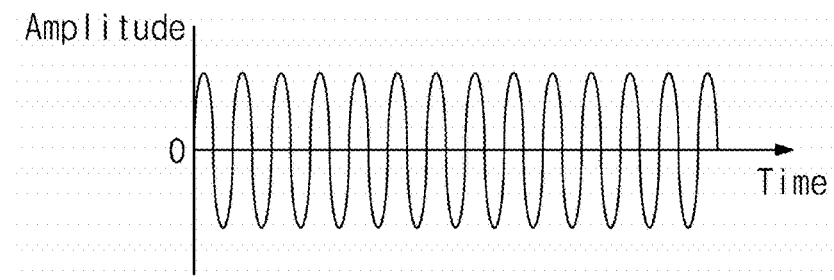
FIG. 8 is a conceptual diagram for describing a transmitting signal, the modulation index of which is "0".

FIG. 6 is a conceptual diagram for describing a transmitting signal, the modulation index of which is a value (excluding "0" and "1") between "0" and "1". FIG. 7 is a conceptual diagram for describing a transmitting signal, the modulation index of which is "1". FIG. 8 is a conceptual diagram for describing a transmitting signal, the modulation index of which is "0". For better understanding, FIGS. 6 to 8 will be described together. Also, for better understanding, FIGS. 2 and 4 will be referenced together.

Referring to FIGS. 2, 5 and 6-8, as described with reference to FIG. 2, the wireless communication device 110 may modulate an information signal to generate the plurality of transmitting signals ts(1) to ts(m). Modulation indexes of the transmitting signals ts(1) to ts(m) may be different. The modulation index may indicate the degree to which an information signal is modulated. The modulation index may have a value (including "0" and "1") between "0" and "1".

Modulation indexes of transmitting signals of Type F, Type V, and Type B may have a value (excluding "0" and "1") between "0" and "1". A transmitting signal of Type V may include a transmitting signal, the modulation index of which is "1"; however, unless separately mentioned, a transmitting signal of Type V mentioned in this specification indicates a transmitting signal, the modulation index of which is about "0.1". In detail, modulation indexes of transmitting signals of Type F, Type V, and Type B may have a value between "0.08" and "0.15". A modulation index of a transmitting signal of Type F may be greater than a modulation index of a transmitting signal of Type V, and the modulation index of the transmitting signal of Type V may be greater than a modulation index of a transmitting signal of Type B. A waveform of a transmitting signal, the modulation index of which is a value (excluding "0" and "1") between "0" and "1" may be similar to a waveform illustrated in FIG. 6.

For another example, a modulation index of a transmitting signal of Type A may be "1". The transmitting signal of Type A may be replaced with a transmitting signal of Type V, the modulation index of which is "1". A waveform of a transmitting signal, the modulation index of which is "1" may be similar to a waveform illustrated in FIG. 7. Referring to FIG. 7, in the case where a transmitting signal of Type A is transmitted to the wireless communication device 120, a time t0 at which a signal transmitted to the wireless communication device 120 does not exist may exist. In detail, at the time t0, a power may not be transmitted from the wireless communication device 110 to the wireless communication device 120. In the case where a transmitting signal, the modulation index of which exceeds "1", is transmitted, within an interval including the time t0, a power may not be transmitted from the wireless communication device 110 to the wireless communication device 120. The wireless communication device 120, the type of which is not Type A, may be reset or turned off at the time t0 or within an interval including the time t0. In this case, the wireless communication device 120 may have to receive a power again for the purpose of communicating with the wireless communication device 110.

For another example, a modulation index of a transmitting signal of Type K may be "0". A waveform of a transmitting signal, the modulation index of which is "0" may be similar to a waveform illustrated in FIG. 8. Referring to FIG. 8, in the case where a transmitting signal, the modulation index of which is "0", is transmitted, a power of a given magnitude may be supplied from the wireless communication device 110 to the wireless communication device 120. A waveform of a transmitting signal, the modulation index of which is "0", may be the same as a waveform of the power signal cw0 or the receiving signal cw1 of FIG. 4. Accordingly, even though a transmitting signal of Type A is output before a transmitting signal of Type K is output, the wireless communication device 110 may not output the power signal cw0 within a separate guard interval. The wireless communication device 110 may communicate with the wireless communication device 120 of Type K by outputting only a transmitting signal of Type K without again outputting the power signal cw0.

Figure 9:
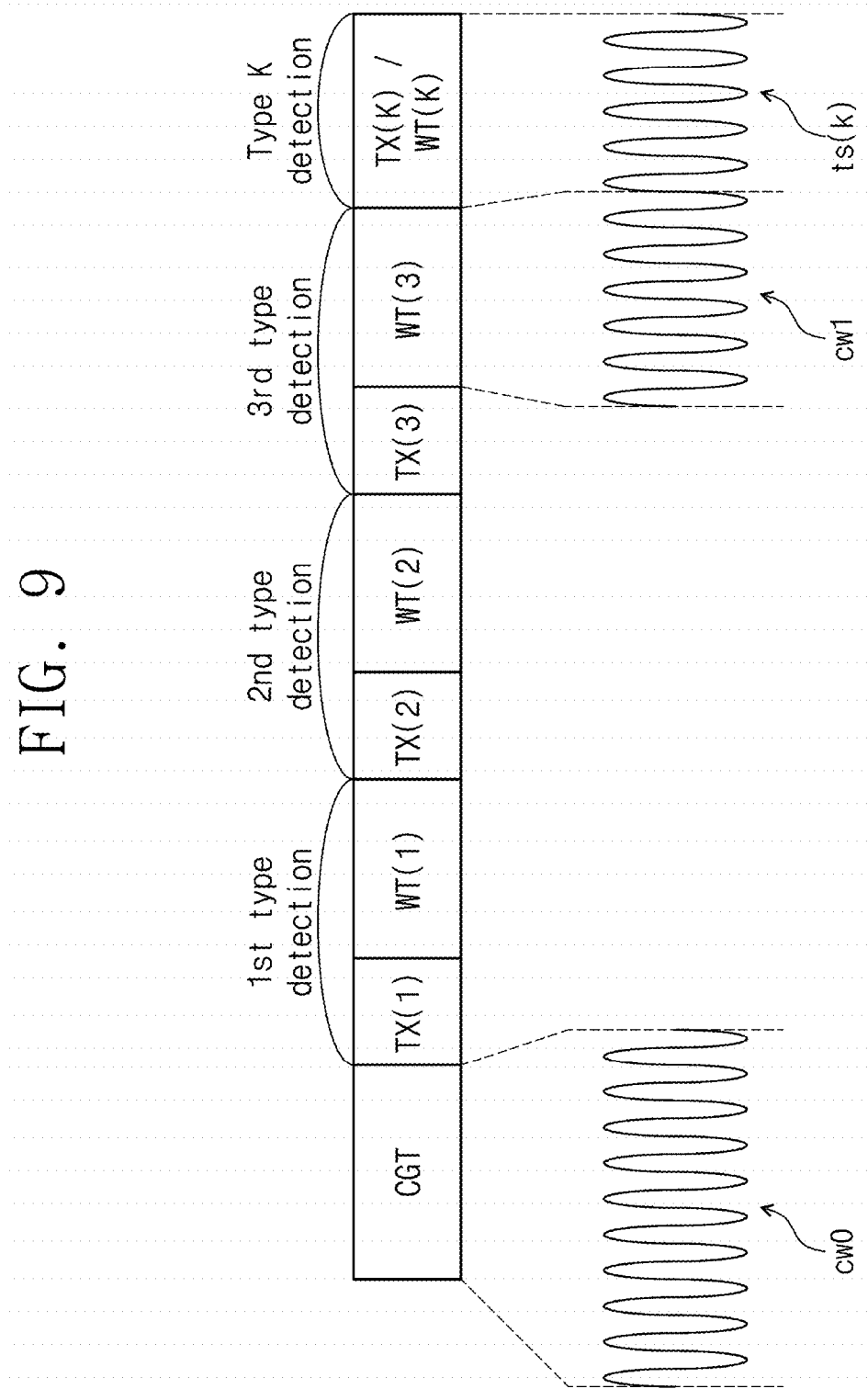
FIG. 9 is a conceptual diagram for describing a detection signal according to an example embodiment of the inventive concepts.

FIG. 9 is a conceptual diagram for describing the detection signal ds2 according to an example embodiment of the inventive concepts. For better understanding, FIGS. 4 and 6 to 8 will be referenced together.

Referring to FIGS. 4, 6, 8 and 9, FIG. 9 shows the common guard interval CGT and a plurality of communication intervals (TX(1), WT(1)), (TX(2), WT(2)), (TX(3), WT(3)), and TX(K)/WT(K). An example is described with reference to FIG. 9 as the three communication intervals (TX(1), WT(1)) to (TX(3), WT(3)) are included between the common guard interval CGT and the communication interval TX(K)/WT(K), but example embodiments of the inventive concepts are not limited thereto. For example, one or more communication intervals may be included between the common guard interval CGT and the communication interval TX(K)/WT(K). As described with reference to FIG. 4, the wireless communication device 110 may output signals corresponding to the common guard interval CGT and the plurality of communication intervals (TX(1), WT(1)), (TX(2), WT(2)), (TX(3), WT(3)), and TX(K)/WT(K)) in an order in which the common guard interval CGT and the plurality of communication intervals (TX(1), WT(1)), (TX(2), WT(2)), (TX(3), WT(3)), and TX(K)/WT(K)) are listed.

The plurality of communication intervals (TX(1), WT(1)), (TX(2), WT(2)), and (TX(3), WT(3)) may be referred to as "first communication intervals". Modulation indexes of communication signals that are output within the first communication intervals may be greater than "0". For example, the first communication intervals may be listed in descending order from highest to lowest modulation indexes of transmitting signals corresponding to the first communication intervals. In detail, communication signals that are output within the communication intervals (TX(1), WT(1)) to (TX(3), WT(3)) may be signals of Type B, Type V, and Type F, respectively. For another example, the first communication intervals may be listed such that a modulation index of a transmitting signal output within the last communication interval is the greatest. A modulation index of a transmitting signal that is output within the last communication interval of the first communication intervals may be "1". However, the above order is only an example embodiment, and example embodiments of the inventive concepts are not limited thereto.

The wireless communication device 110 may communicate with the wireless communication device 120 within the communication intervals (TX(1), WT(1)) to (TX(3), WT(3)), based on a power supplied to the wireless communication device 120 within the common guard interval CGT. A time length of the common guard interval CGT may be a desired (or, alternatively, a minimum) time length to supply a desired (or, alternatively, a minimum) power required for the wireless communication device 120 to communicate with the wireless communication device 110 within the communication intervals (TX(1), WT(120)) to (TX(3), WT(3)). FIG. 9 illustrates waveforms of signals cw0, cw1, and ts(k). A horizontal direction of the waveforms of the signals cw0, cw1, and ts(k) indicates a time, and a vertical direction of the waveforms of signals cw0, cw1, and ts(k) indicates an amplitude.

A modulation index of the communication signal ts(k) that is output within the communication interval TX(K)/WT (K) may be "0". The communication signal ts(k) may be a signal that is used to detect the wireless communication device 120 of Type K. As described with reference to FIG. 8, a waveform of the communication signal ts(k) may be the same as the waveform of the receiving signal cw1. Accordingly, the communication signal ts(k) may not be divided into a transmitting signal and a receiving signal. Also, the communication signal TX(K)/WT(K) may not be divided into a transmitting interval and a receiving interval. The wireless communication device 110 may transmit information to the wireless communication device 120 across the communication interval TX(K)/WT(K) by using the communication signal ts(k). Also, the wireless communication device 110 may wait to receive the response signal rs2 across the communication interval TX(K)/WT(K) by using the communication signal ts(k). Accordingly, a time length of the communication interval TX(K)/WT(K) may be shorter than a time length of each of the communication intervals (TX(1), WT(1)) to (TX(3), WT(3)).

As described with reference to FIG. 8, a waveform of the communication signal ts(k) may be the same as the waveform of the receiving signal cw1 that is output within the receive interval WT(3). Accordingly, the wireless communication device 110 may use the receiving signal cw1 that is output within the reception interval WT(3), as the communication signal ts(k). That is, the wireless communication device 110 may communicate with the wireless communication device 120 by using the receiving signal cw1 that is output within the reception interval WT(3). Accordingly, a time length of the communication interval TX(K)/WT(K) in which the wireless communication device 110 communicates with the wireless communication device 120 may become shorter. That the time length of the communication interval TX(K)/WT(K) becomes short may mean that a time when the wireless communication device 110 outputs the communication signal ts(k) becomes short. That is, according to an example embodiment of the inventive concepts, a magnitude of a power that the wireless communication device 110 consumes within the communication interval TX(K)/WT(K) may decrease. The wireless communication device 110 may reduce a power that is consumed to detect the wireless communication device 120, by using the detection signal ds2 according to an example embodiment of the inventive concepts.

Figure 10:
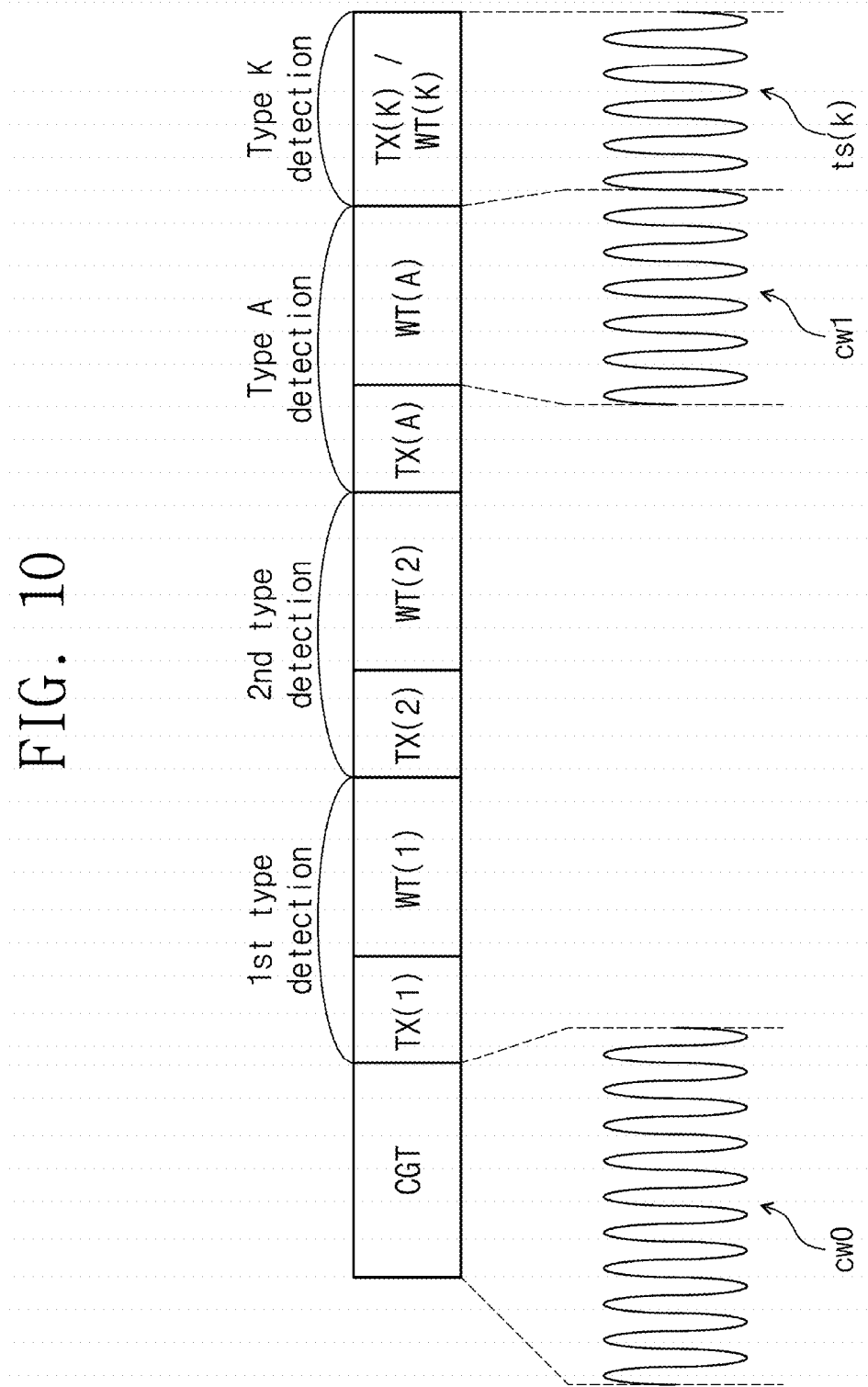
FIG. 10 is a conceptual diagram for describing a detection signal according to an example embodiment of the inventive concepts.

FIG. 10 is a conceptual diagram for describing the detection signal ds2 according to an example embodiment of the inventive concepts. For better understanding, FIGS. 4 and 6 to 9 will be referenced together.

Referring to FIGS. 4 and 6-10, FIG. 10 illustrates the case where the communication interval (TX(3), WT(3)) of the detection signal ds2 illustrated in FIG. 9 is the communication interval (TX(A), WT(A)). That is, FIG. 10 includes the common guard interval CGT and the plurality of communication intervals (TX(1), WT(1)), (TX(2), WT(2)), (TX(A), WT(A)), and (TX(K)/WT(K)). An example is described with reference to FIG. 10 as the two communication intervals (TX(1), WT(1)) and (TX(2), WT(2)) are included between the common communication interval CGT and the communication interval (TX(A), WT(K)), but example embodiments of the inventive concepts are not limited thereto. For example, one or more communication intervals may be included between the common guard interval CGT and the communication interval (TX(A), WT(A)). FIG. 10 illustrates waveforms of the signals cw0, cw1, and ts(k). A horizontal direction of the waveforms of the signals cw0, cw1, and ts(k) indicates a time, and a vertical direction of the waveforms of signals cw0, cw1, and ts(k) indicates an amplitude.

A modulation index of each of transmitting signals that are output within the communication intervals (TX(1), WT(1)) and (TX(2), WT(2)) may be a value (excluding "0" and "1") between "0" and "1". A modulation index of a transmitting signal that is output within the communication interval TX(A) may be "0". Below, a transmitting signal that is output within the transmission interval TX(A) is expressed by a transmitting signal ts(a). As described with reference to FIG. 8, in the case where the wireless communication device 120, the type of which is not Type A, receives the transmitting signal ts(a), the wireless communication device 120 may be reset or turned off at the time t0. Accordingly, the wireless communication device 110 may need to again supply a power to the wireless communication device 120 for the purpose of communicating with the wireless communication device 120 after the transmitting signal ts(a) is output.

The wireless communication device 120 may be partially supplied with a power through the receiving signal cw1 output within the reception interval WT(A), but may require a power more than the power supplied within the reception interval WT(A) for the purpose of communicating the wireless communication device 110. Accordingly, a separate guard interval may be required for the wireless communication device 120 to communicate with the wireless communication device 110.

However, in the case where the communication interval (TX(A), WT(A)) is followed by the communication interval TX(K)/WT(K), the wireless communication device 110 may not include a separate guard interval. A waveform of the communication signal ts(k) may be the same as a waveform of the power signal cw0. Accordingly, the wireless communication device 110 may supply a power to the wireless communication device 120 through the transmitting signal ts(k). That is, the wireless communication device 120 may communicate with the wireless communication device 110 by using a power that is supplied through the receiving signal cw1 output within the reception interval WT(A) and the transmitting signal ts(k) output within the communication interval (TX(K)/WT(K)).

Accordingly, the wireless communication device 110 may reduce a power that is consumed to detect the wireless communication device 120 by using the detection signal ds2 where the communication intervals (TX(A), WT(A)) and (TX(K)/WT(K)) are at the last location.

Figure 11:
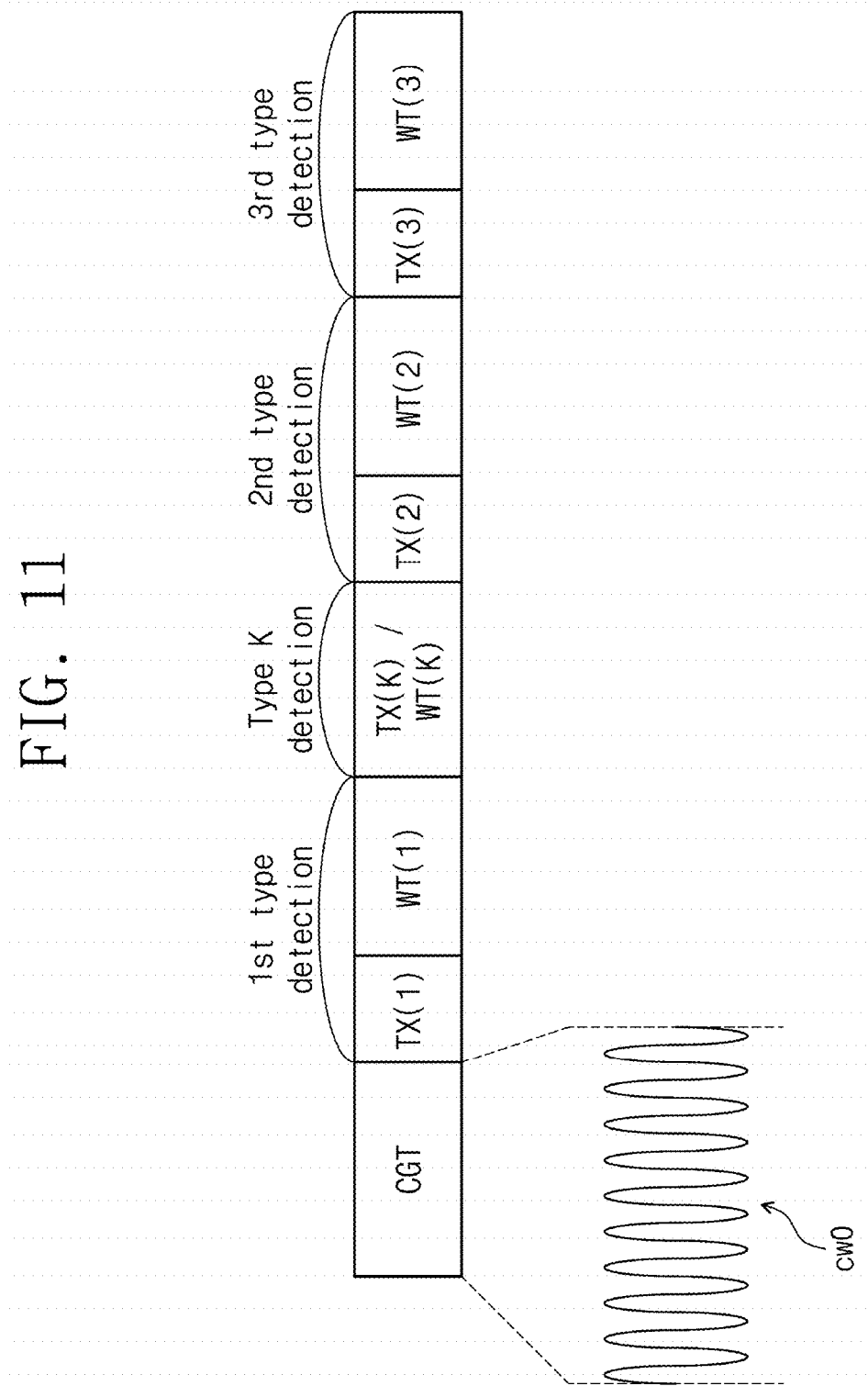
FIG. 11 is a conceptual diagram for describing a detection signal according to an example embodiment of the inventive concepts.

FIG. 11 is a conceptual diagram for describing the detection signal ds2 according to an example embodiment of the inventive concepts. For better understanding, FIGS. 4 and 6 to 10 will be referenced together.

Referring to FIGS. 4 and 6 to 11, FIG. 11 shows the common guard interval CGT and a plurality of communication intervals (TX(1), WT(1)), (TX(K)/WT(K)), (TX(2), WT(2)), and (TX(3), WT(3)). An example will be described with reference to FIG. 11 as the communication interval TX(K)/WT(K) corresponds to a second communication interval of the plurality of communication intervals (TX(1), WT(1)), (TX(K)/WT(K)), (TX(2), WT(2)), and (TX(3), WT(3)).

As described with reference to FIGS. 8 to 10, a waveform of the communication signal ts(k) may be the same as a waveform of the receiving signal cw1. Accordingly, the communication signal ts(k) may not be divided into a transmitting signal and a receiving signal. The wireless communication device 110 may transmit information to the wireless communication device 120 across the communication interval TX(K)/WT(K) by using the communication signal ts(k). Also, the wireless communication device 110 may wait to receive the response signal rs2 across the communication interval TX(K)/WT(K) by using the communication signal ts(k). Accordingly, a time length of the communication interval TX(K)/WT(K) may be shorter than a time length of each of the communication intervals (TX(1), WT(1)), (TX(2), WT(2)), and (TX(3), WT(3)).

Also, the wireless communication device 110 may use the receiving signal cw1 that is output within the reception interval WT(1) in front of the communication interval TX(K)/WT(K), as the communication signal ts(k). Accordingly, a time length of the communication interval TX(K)/WT(K) in which the wireless communication device 110 communicates with the wireless communication device 120 may become shorter. Also, that the time length of the communication interval TX(K)/WT(K) becomes short may mean that a magnitude of a power that the wireless communication device 110 consumes within the communication interval TX(K)/WT(K) may decrease.

Also, because the waveform of the transmitting signal ts(k) is the same as the waveform of the power signal cw0, the wireless communication device 110 may supply a power to the wireless communication device 120 through the transmitting signal ts(k). That is, the wireless communication device 120 may communicate with the wireless communication device 110 by using a power that is supplied through the receiving signal cw1 output within the reception interval WT(A) and the transmitting signal ts(k) output within the communication interval (TX(K)/WT(K)). Accordingly, a time length of the common guard interval CGT may be a desired (or, alternatively, a minimum) time length that is necessary to supply a (desired, or alternatively, a minimum) power required for the wireless communication device 120 to communicate with the wireless communication device 110 within the communication intervals (TX(1), WT(1)) to (TX(3), WT(3)).

Accordingly, the total time length of the common guard interval CGT and the plurality of communication intervals (TX(1), WT(1)), (TX(K)/WT(K)), (TX(2), WT(2)), and (TX(3), WT(3)) may become short. That is, the wireless communication device 110 may reduce a power that is consumed to detect the wireless communication device 120, by using the detection signal ds2 according to an example embodiment of the inventive concepts.

A wireless communication device according to an example embodiment of the inventive concepts may reduce (or, alternatively, minimize) a time length of an interval (i.e., a guard time) where a power is supplied to a card. Accordingly, according to example embodiments of the inventive concepts, a power that is consumed to detect a card may decrease.

While example embodiments of the inventive concepts have been described with reference to some example embodiments thereof, it will be apparent to those of ordinary skill in the art that various changes and modifications may be made thereto without departing from the spirit and scope of the example embodiments of the inventive concepts as set forth in the following claims.

What is claimed is:

1. A wireless communication device configured to wirelessly communicate with a card external to the wireless communication device, the wireless communication device comprising:
   a signal generating circuit configured to,
      generate a power signal associated with supplying a first power to the card, and output the power signal to the card via a transceiver,
      generate first communication signals associated with wirelessly communicating with the card based on the first power, and output the first communication signals to the card via the transceiver after outputting the power signal such that the first communication signals are output without discrete power signals therebetween and each include (i) a transmitting signal for transmitting information to the card and (ii) a receiving signal for receiving a response signal from the card where, within each of the first communication signals, the receiving signal has a higher amplitude than the transmitting signal associated therewith, and
      generate a second communication signal associated with wirelessly communicating with the card, and output the second communication signal to the card via the transceiver after outputting the first communication signals such that a waveform of the second communication signal is same as a waveform of the receiving signal included in a last one of the first communication signals output by the wireless communication device; and
   a detecting circuit configured to detect the response signal received wirelessly from the card, in response to the first communication signals or the second communication signal being wirelessly output to the card.

2. The wireless communication device of claim 1, wherein the signal generating circuit generates the second communication signal by modulating an information signal based on a modulation index, the information signal including information for communicating with the card, the modulation index indicating a degree to which the information signal is modulated when the second communication signal is generated.

3. The wireless communication device of claim 2, wherein the modulation index of the second communication signal is "0".

4. The wireless communication device of claim 1, wherein the wireless communication device outputs the power signal for a guard interval such that a time length of the guard interval is a time to supply the card with the first power for the wireless communication device to communicate with the card while the first communication signals are output.

5. The wireless communication device of claim 1, wherein the signal generating circuit is configured to generate the first communication signals such that a time length of a reception interval where one of the receiving signals is output is a minimum time length for the detecting circuit to detect the response signal when the response signal is output from the card within the reception interval.

6. The wireless communication device of claim 1, wherein the signal generating circuit generates the first communication signals and the second communication signal such that the receiving signal included in the last one of the first communication signals has a same waveform as the second communication signal output sequentially thereafter.

7. A wireless communication device configured to wirelessly communicate with a card external to the wireless communication device, the wireless communication device comprising:
   a signal generating circuit configured to,
      generate a power signal associated with supplying a power to the card, and output the power signal to the card via a transceiver,
      generate first communication signals associated with wirelessly communicating with the card based on the power, and output the first communication signals to the card via the transceiver after outputting the power signal such that the first communication signals are output without discrete power signals therebetween and each include (i) a transmitting signal for transmitting information to the card and (ii) a receiving signal for receiving a response signal from the card where, within each of the first communication signals, the receiving signal has a higher amplitude than the transmitting signal associated therewith, and
      generate a second communication signal associated with wirelessly communicating with the card, and output the second communication signal to the card via the transceiver after outputting the first communication signals such that a waveform of the second communication signal is same as a waveform of the receiving signal included in a last one of the first communication signals output by the wireless communication device; and
   a detecting circuit configured to detect the response signal received wirelessly from the card, in response to output of one or more of the first communication signals and the second communication signal, wherein the power signal, the first communication signals and the second communication signal are wirelessly output sequentially from the wireless communication device to the card external thereto.

8. The wireless communication device of claim 7, wherein the signal generating circuit generates the second communication signal based on a modulation index, the modulation index of the second communication signal being "0".

9. The wireless communication device of claim 7, wherein the signal generating circuit generates the first communication signals based on a modulation index such that the modulation index of last one of the first communication signals is "1".

10. The wireless communication device of claim 7, wherein
   the signal generating circuit generates the first communication signals based on a modulation index such that the modulation index of an (n)th one of the first communication signals is smaller than the modulation index of an (n+1)th one of the first communication signals, wherein n is a natural number.

11. The wireless communication device of claim 7, wherein the detecting circuit detects the response signal received from the card in response to one of the transmitting signals included in the first communication signals output thereto or the second communication signal output thereto corresponding to a type of the card.

12. A wireless communication device configured to wirelessly communicate with a card external to the wireless communication device comprising:

a signal generating circuit configured to,
  generate a power signal for supplying a power to the card, and
  generate communication signals for wirelessly communicating with the card based on the power such that at least one of the communication signals includes a receiving signal having a continuous waveform equal to the power signal and different from waveforms of other receiving signals included in other ones of the communication signals and communication signals following a first one of the communication signals are output without discrete power signals therebetween; and a detecting circuit configured to detect the card based on a response signal wirelessly received from the card, in response to the receiving signal included in one of the communication signals wirelessly output thereto corresponding to a type of the card.

13. The wireless communication device of claim 12, wherein the wireless communication device is configured to sequentially output different ones of the communication signals until the detecting circuit detects the card such that all of the communication signals are output in a case where the detecting circuit does not detect the card.

14. The wireless communication device of claim 12, wherein the signal generating circuit generates the communication signals based on modulation indexes such that one of the modulation indexes corresponding to at least one of the communication signals is "0".

15. The wireless communication device of claim 12, wherein the signal generating circuit generates the communication signals based on modulation indexes such that one of the modulation indexes corresponding to a last one of the communication signals output by the wireless communication device is "1".

16. The wireless communication device of claim 12, wherein the detecting circuit is configured to detect the card by detecting a start of frame (SOF) of the response signal.

* * * * *